WILLIAM A. BERNARD.
Improvement in Tobacco-Knife.
No. 128,010.  Patented June 18, 1872.
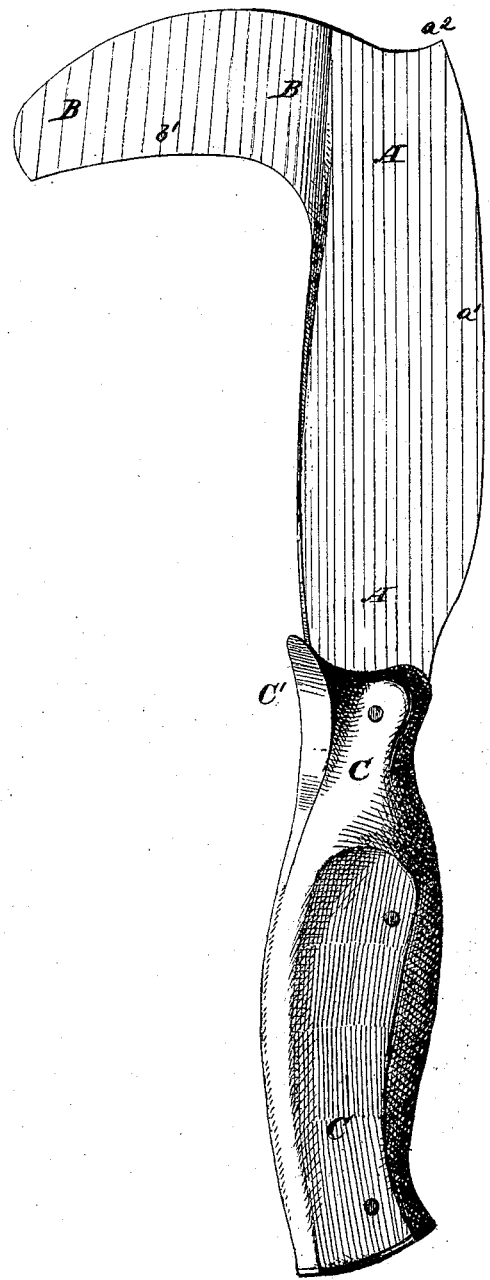

UNITED STATES PATENT OFFICE.

WILLIAM A. BERNARD, OF DANVILLE, VIRGINIA.

IMPROVEMENT IN TOBACCO-KNIVES.

Specification forming part of Letters Patent No. 128,010, dated June 18, 1872.

Specification describing a new and useful Improvement in Tobacco-Knives, invented by WILLIAM A. BERNARD, of Danville, in the county of Pittsylvania and State of Virginia.

The figure is a side view of my improved knife.

My invention has for its object to furnish an improved knife, designed especially for harvesting tobacco, and which shall be so constructed as to enable the various operations to be performed with ease and dispatch, and without hurting, blistering, or tiring the hand of the operator; and it consists in the knife constructed as hereinafter more fully described.

A is the main body of the blade, having a curved cutting-edge, $a^1$, formed upon its forward side. The end of the blade A is concaved so as to form a sharp point, $a^2$, at the end of the edge $a^1$. Upon the back of the end of the blade A is formed a hook-shaped blade, B, the upper edge $b'$ of which is made sharp, and is concaved, as shown in the figure. The back of the blade B is made convex, and curves gradually into the concavity of the end of the blade A. C is the handle, which is securely attached to the shank of the blade A. The handle C is formed, as shown in the figure, to fit the hand, and has a rest, $c'$, formed upon the upper side of its forward end to receive the thumb of the operator and give it a convenient support when pressing downward with the knife.

In harvesting tobacco the stalk of the plant is first slit longitudinally to receive the stick upon which it is hung for drying, and is then cut off below said slit. This work has heretofore been done with a straight butcher-knife, the stalk being cut off with a downward pressure, the knife frequently entering the ground and being dulled and injured. With my improved knife the sharp point $a^2$ and curved edge $a^1$ enable it to enter the stalk easily in making the slit, and the hook-blade B, with its sharp concave edge, enables the stalk to be readily cut off with an upward pressure, so that the knife cannot be dulled by being thrust into the ground. At the same time the peculiar form of the handle C enables the knife to be used without hurting, blistering, or tiring the hand.

Having thus described my invention, I claim as new and desire to secure by Letters Patent—

1. A knife-handle, C, having thumb-rest $C'$ and convex back on top, and concavity near each end of the under side, as described, so as to fit the hand of operator and enable him to make an upward cut.

2. As an article of manufacture, a tobacco-knife, consisting of blade A $a^1$ $a^2$ B $b'$ and handle C $C'$, each constructed in all essential respects as and for the purpose set forth.

WILLIAM A. BERNARD.

Witnesses:
JAMES Y. REID,
C. BIEHARZ.